US011065951B2

(12) United States Patent
Moestam

(10) Patent No.: US 11,065,951 B2
(45) Date of Patent: Jul. 20, 2021

(54) CHARGE AIR SHUTTER

(71) Applicant: Ningbo Geely Automobile Research & Development Co., Ltd., Ningbo (CN)

(72) Inventor: Robert Moestam, Växjö (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 260 days.

(21) Appl. No.: 16/098,580

(22) PCT Filed: May 11, 2017

(86) PCT No.: PCT/EP2017/061356
§ 371 (c)(1),
(2) Date: Nov. 2, 2018

(87) PCT Pub. No.: WO2017/194684
PCT Pub. Date: Nov. 16, 2017

(65) Prior Publication Data
US 2019/0143804 A1    May 16, 2019

(30) Foreign Application Priority Data

May 11, 2016  (EP) ..................... 16169186

(51) Int. Cl.
*B60K 11/00*      (2006.01)
*B60K 11/08*      (2006.01)

(52) U.S. Cl.
CPC ............. *B60K 11/085* (2013.01); *Y02T 10/88* (2013.01)

(58) Field of Classification Search
CPC ....... B60K 11/00; B60K 11/08; B60K 11/085; B60K 11/02; B60K 11/06; B62D 35/00; B62D 35/001; B62D 35/005; B62D 35/02
See application file for complete search history.

(56) References Cited

U.S. PATENT DOCUMENTS 1,335,356 A * 3/1920 Vaughan ............ F01P 7/10
165/271
5,660,149 A * 8/1997 Lakerdas ............ F01P 5/06
123/41.44
(Continued)

FOREIGN PATENT DOCUMENTS

DE    2439033 A1    3/1975
DE    3942010 A1    6/1991
FR    2953003 A1    5/2011

OTHER PUBLICATIONS

International Search Report and Written Opinion from corresponding International Patent Application No. PCT/EP2017/061356, dated Jul. 12, 2017; 11 pages.

(Continued)

*Primary Examiner* — James M Dolak
(74) *Attorney, Agent, or Firm* — Tucker Ellis LLP

(57) ABSTRACT

A passive shutter mechanism (10; 20) for a cooling pack (2) in a vehicle (1) adapted to selectively close at least part of an airflow path into the cooling pack (2), wherein the shutter mechanism comprises at least one blocking member (11; 21) adapted to be displaced between an open position, wherein air may flow into the cooling pack (2), and a closed position, wherein air is prevented from flowing into at least part of the cooling pack (2), depending on the movement of the vehicle (1). A vehicle (1) comprising such a passive shutter mechanism, as well as a method of operating such a passive shutter mechanism is also disclosed.

15 Claims, 3 Drawing Sheets

(56) References Cited

U.S. PATENT DOCUMENTS

| | | | | |
|---|---|---|---|---|
| 6,106,228 | A * | 8/2000 | Bartlett | F01P 11/10 |
| | | | | 123/41.11 |
| 7,559,391 | B2 * | 7/2009 | Bradley | B60K 11/085 |
| | | | | 180/68.1 |
| 9,579,968 | B2 * | 2/2017 | Rizzon | B60K 11/08 |
| 9,738,152 | B2 * | 8/2017 | Yoon | B60K 11/085 |
| 9,780,422 | B2 * | 10/2017 | Dunn | B60H 1/00278 |
| 9,827,846 | B2 * | 11/2017 | Porras | B60K 6/48 |
| 9,925,861 | B2 * | 3/2018 | Bruckner | B60K 11/085 |
| 9,951,675 | B2 * | 4/2018 | Park | F01P 5/02 |
| 10,150,362 | B2 * | 12/2018 | Wiech | B60K 11/04 |
| 10,350,988 | B2 * | 7/2019 | Kim | F01P 11/10 |
| 10,766,354 | B2 * | 9/2020 | Takai | B60K 11/04 |
| 10,875,384 | B2 * | 12/2020 | Sato | B60H 1/00899 |
| 10,941,694 | B2 * | 3/2021 | Ritz | B60K 11/085 |
| 10,946,720 | B2 * | 3/2021 | Sakane | F01P 7/10 |
| 10,946,910 | B2 * | 3/2021 | Slight | B62D 35/00 |
| 10,953,934 | B2 * | 3/2021 | Herlem | B62D 35/02 |
| 2009/0130968 | A1 * | 5/2009 | Harich | F01P 11/10 |
| | | | | 454/148 |
| 2014/0151139 | A1 | 6/2014 | Rizzon | |

OTHER PUBLICATIONS

European Search Report from corresponding European Application No. 16169186.0, dated Feb. 1, 2017; 9 pages.

* cited by examiner

CHARGE AIR SHUTTER

TECHNICAL FIELD

The present invention relates generally to passive shutter mechanisms for cooling packs in motor vehicles.

BACKGROUND ART

In cooling systems for automotive vehicles having a brick layout the charge air cooler is usually located under the condenser and radiator in a cooling pack. The charge air cooler usually consists of a heat exchanger connected between the turbocharger and the engine to cool the turbocharged air before it enters the engine. A fan mounted behind the cooling pack pulls air through the cooling pack.

In prior art it is known to provide actively operated air guides or shutter mechanisms to close off the airflow path to the charge air cooler. Such active shutter mechanisms use actuators which may be mechanical, electrical or pneumatic.

DE 39 42 010 discloses such an actively operated system having a cooling-air flap held closed directly by a retaining or fixing force. This force is produced by a permanent magnet whose force of attraction is adjusted to the pressure difference acting on the flap above a given vehicle speed, i.e. the cooling flap is only opened when absolutely necessary such as at high vehicle speeds. At lower speeds, the cooling flap remains closed. Alternatively, the force may be produced by an electromagnet controlled by speed and/or engine temperature.

U.S. Pat. No. 1,335,356 discloses an automatically opening and closing radiator damper which may be caused to open by air pressure due to forward motion of an automobile vehicle. The damper is connected to a vane via a rod such that air pressure acting on the vane will swing the vane backward to open the damper. The damper comprises swinging flaps or shutters which cover the whole radiator in the closed position such as to retain the heat of the liquid therein when the automobile is stopped, especially in cold weather. Such a solution is highly undesirable in modern vehicles since it could lead to overheating and damage of the engine.

SUMMARY OF INVENTION

The inventor realized that in idle when the vehicle is at rest, the need for cooling the charge air cooler is low, but the fan still pulls air through it since it is mounted within the fan shroud delimiting the conduit. On the other hand, when parking hybrid cars in a hot climate, the battery needs to be cooled by the condenser. Ultimately, the fan-condenser efficiency is what limits the battery time, due to required battery cooling. The fan-cooling performance can be improved if all the air pulled through the conduit by the fan only passes through the condenser, and not through the charge air cooler.

Shutter mechanisms of the prior art use actuators which may be mechanical, electrical or pneumatic and leads to overly complex and expensive systems. Thus, there is a need to develop improved shutter mechanisms which enable passive actuation and do not require complex actuating components and control systems.

An object of the present invention is to provide an improved shutter mechanism for a cooling pack in a motor vehicle which enables passive actuation to open and close the shutter mechanism. This object is achieved in a first aspect of the invention by a passive shutter mechanism for a cooling pack in a vehicle adapted to selectively close one portion of an airflow path into the cooling pack, wherein the shutter mechanism comprises at least one blocking member adapted to be displaced between an open position when the vehicle is moving, wherein air may flow into the whole cooling pack, and a closed position when the vehicle is at rest, wherein air is prevented from flowing into one portion of the cooling pack. The actuation of the shutter mechanism is entirely passive in that it is governed solely by the movement of the vehicle. Thereby, the need for a separate controller and actuator for the shutter mechanism is obviated which facilitates manufacture and installation as well as reducing the cost of the shutter mechanism.

By arranging the blocking member such that it is displaced to the closed position when the vehicle is standing still, the parts of the cooling pack that do not require cooling in idle can easily be blocked, thereby increasing the flow of air through the remaining parts of the cooling pack. The displacement of the blocking member can be achieved e.g. by the weight of passive shutter mechanism and/or the suction effect of the fan to pull the blocking member to the closed position.

In a preferred embodiment, the at least one blocking member comprises at least one damper arranged to be pivoted between the open and closed position about at least one axis of rotation substantially perpendicular to the direction of airflow into the cooling pack. The perpendicular orientation of the axis of rotation facilitates pivoting of the blocking member and provides a robust and simple construction. Preferably, the at least one axis of rotation of the at least one blocking member is arranged substantially horizontal. Alternatively, the at least one axis of rotation of the at least one blocking member is arranged substantially vertical.

In an alternative embodiment, the at least one blocking member further comprises at least one plate protruding below the vehicle such that air flowing underneath the vehicle when the vehicle is moving will act on the plate to pivot the blocking member to the open position. The protruding plate acts as a lever which allows for a quick and reliable actuation of the blocking member when the vehicle is moving to unblock the parts of the cooling pack previously covered by the blocking member.

In a further preferred embodiment, the at least one blocking member comprises a plurality of dampers, each arranged to be pivoted about an axis of rotation between an open position and a closed position depending on the movement of the vehicle. Preferably, the dampers are arranged to work in concert like window blinds by means of an interconnecting pushrod, to selectively close desired portions of the cooling pack. Advantageously, the dampers require less space for operating in the position in front of the cooling pack, thus making the shutter mechanism more compact.

In a second aspect of the present invention, there is provided a vehicle comprising a cooling pack and a passive shutter mechanism according to the first aspect.

In a preferred embodiment, the vehicle further comprises a battery pack arranged in fluid connection with a first portion of the cooling pack, the cooling pack further comprising a second portion not in fluid connection with the battery pack and wherein the at least one blocking member is arranged to block the inlet into the second portion of the cooling pack, when the vehicle is at rest. The second portion of the cooling pack may constitute the charge air cooler of the cooling pack.

In idle mode, the need for cooling the charge air cooler is low but the battery pack still requires cooling. By blocking the inlet to the charge air cooler, the air will only pass into and through the remaining parts of the cooling pack, e.g. the condenser and radiator in fluid communication with the battery pack. This increases the fan/condenser efficiency e.g. to increase cooling capacity and improve battery time in a hybrid car when parking.

In a third aspect of the present invention, there is provided a method of operating a passive shutter mechanism for a cooling pack in a vehicle, wherein the shutter mechanism comprises a blocking member adapted to be displaced between an open position, wherein air may flow into the whole cooling pack, and a closed position, wherein air is prevented from flowing into one portion of the cooling pack, depending on the movement of the vehicle, the method comprising the following steps:

displacing the blocking member to the open position when the vehicle is moving; and displacing the blocking member to the closed position when the vehicle is at rest.

BRIEF DESCRIPTION OF DRAWINGS

The invention is now described, by way of example, with reference to the accompanying drawings, in which.

DESCRIPTION OF EMBODIMENTS

Figure 1:
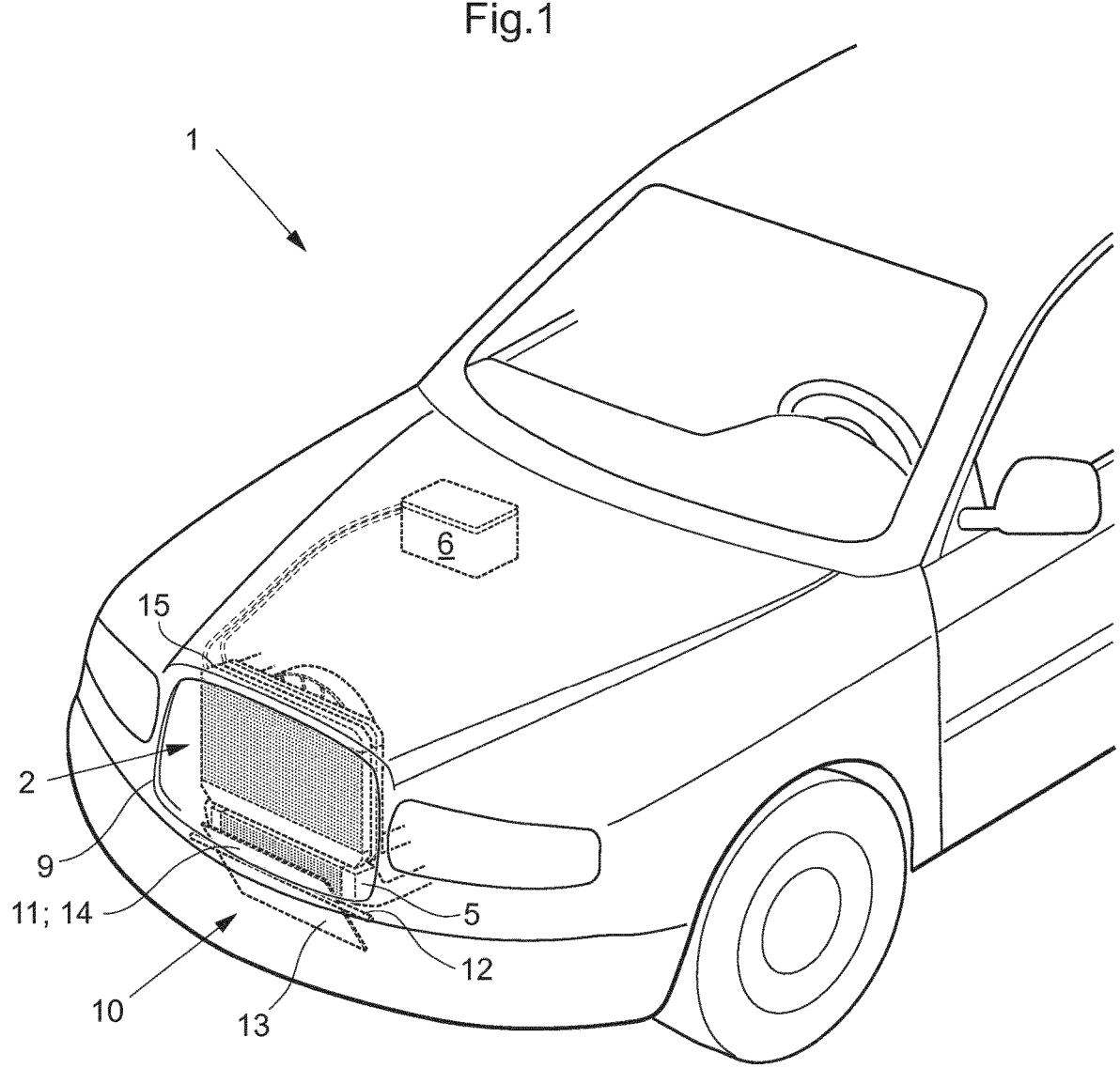
FIG. 1 shows a perspective view of a vehicle including a cooling pack and a passive shutter mechanism according to the present invention.

In the following, a detailed description of a passive shutter mechanism according to the present invention is presented. In the drawing figures, like reference numerals designate identical or corresponding elements throughout the several figures. It will be appreciated that these figures are for illustration only and are not in any way restricting the scope of the invention.

Figure 2:
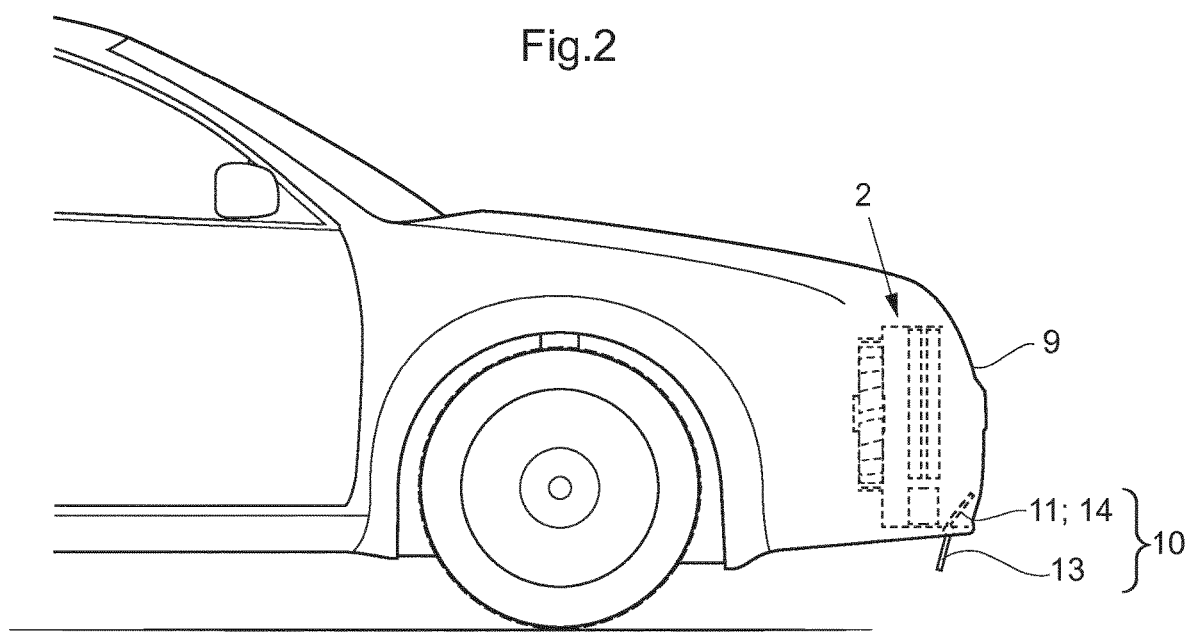
FIG. 2 shows a side view of a vehicle including a cooling pack and a passive shutter mechanism according to the present invention.

In FIG. 1, a perspective view of the front part of a vehicle 1 is shown. In hatched lines, the cooling pack 2 of vehicles is illustrated. The position and size of the cooling pack 2 is only a schematic representation and does not necessarily correspond to the actual size and location in the vehicle 1. Here, the cooling pack 2 is arranged at the front of the vehicle 1, behind the grille 9. FIG. 2 illustrates a side view of the vehicle 1 showing a cross-sectional view of the cooling pack 2 and a passive shutter mechanism 10 according to the present invention.

Figure 3A:
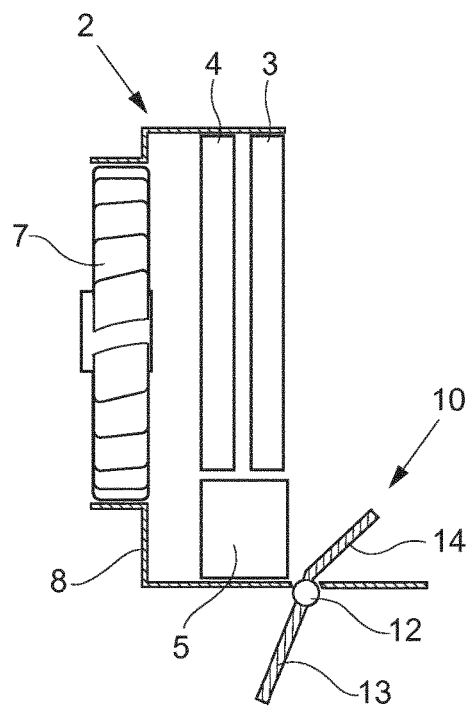
FIG. 3a shows a cross-sectional view of a cooling pack with the passive shutter mechanism according to a first embodiment of the present invention in an open position.
Figure 3B:
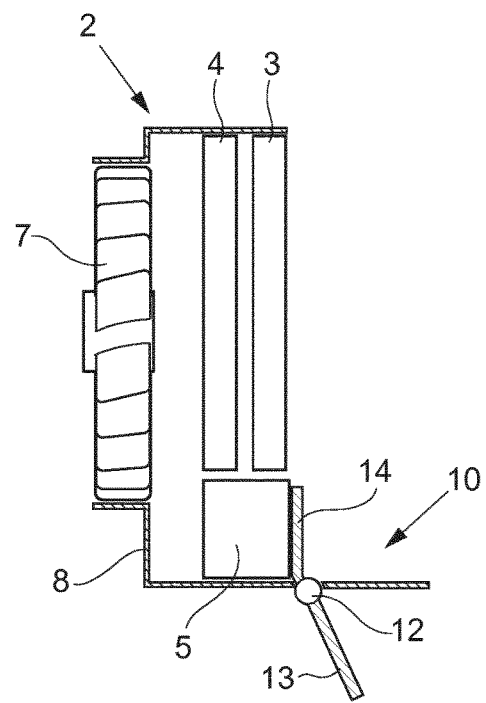
FIG. 3b shows a cross-sectional view of a cooling pack with the passive shutter mechanism according to a first embodiment of the present invention in a closed position.

As explained above in the introduction, the cooling pack 2 typically comprises a condenser 3 and a radiator 4 mounted in a fan shroud 8 defining a cooling duct, illustrated in greater detail in FIGS. 3a and 3b. The radiator 3 and the condenser 4 together constitute a first portion 15 of the cooling pack 2, in fluid communication with a battery pack 6. Thereby, the battery pack 6 may be cooled by the first portion 15 of the cooling pack 2. At the rear end of the fan shroud 8 a fan 7 is arranged to draw air into the fan shroud 8 through the condenser 3 and the radiator 4. Below the condenser 3 and the radiator 4 in this layout, also known as a brick layout, a charge air cooler 5 is likewise mounted within the fan shroud 8 such that cooling air drawn into the fan shroud 8 by the fan 7 also passes through the charge air cooler 5. However, the charge air cooler 5, forming a second portion 5 of the cooling pack 2, is not in fluid communication with the battery pack 6.

In accordance with the invention, there is provided a passive shutter mechanism 10 for selectively shutting or blocking parts of the inlet into the cooling pack 2 depending on the movement of the vehicle 1. To this end the passive shutter mechanism 10 comprises a blocking member 11 adapted to be moved between an open position and a closed position solely in response to movement of the vehicle 1. In the open position, shown in FIG. 3a, air may enter the whole cooling pack 2, i.e. both the first portion 15 including the condenser 3 and radiator 4 as well as the charge air cooler 5. In the closed position, shown in FIG. 3b, at least part of the second portion of the cooling pack 2, e.g. the charge air cooler 5, is blocked by the blocking member 11 such that air is prevented from passing through this part. Instead, all air entering the fan shroud 8 passes through the first portion 15, which gives a higher fan-condenser efficiency to ultimately provide improved cooling capacity of the battery pack 6.

The blocking member 11 comprises a damper 14, also known as shutter, flap or slat, in the shape of a single plate which may be pivoted about an axis of rotation 12 arranged substantially perpendicular to the direction of airflow into the cooling pack 2. This axis of rotation 12 may be arranged either vertically or horizontally, depending on the configuration and placement of the cooling pack 2 in the vehicle 1, to provide optimal pivoting functionality.

Further, the blocking member 11 comprises at least one plate 13 protruding below the vehicle 1. The protruding plate 13 and the blocking member 11 are pivotally arranged to pivot in concert about the axis of rotation 12 to bring the blocking member 11 between the open and closed positions. In operation, the protruding plate 13 is affected by the airflow underneath the vehicle 1 when the vehicle 1 moves (forward). By the fact that the cooling pack 2 and fan shroud 8 is mounted inside the engine compartment of the vehicle 1, behind the grille 9, once the vehicle 1 reaches a certain speed, the air velocity at the inlet to the cooling pack 2 is lower than the air velocity outside and underneath the vehicle 1. The higher air velocity underneath the vehicle 1 acts on the protruding plate 13, pushing it rearward and thus pivoting or tilting the damper 14 forward to the open position. Hence, air is allowed to flow into the charge air cooler 5 and cool the turbocharged air therein.

When the vehicle 1 is at rest, in idle mode or parked, or travelling at low speed, the air velocity at the inlet to the cooling pack 2 is higher than the air velocity underneath the vehicle 1 due to the fan 7 drawing air into the fan shroud 8. Thereby, the blocking member 11 will be sucked toward the fan 7 and pivot to block the inlet into the charge air cooler 5. Also foreseen within the scope of the invention is that the shape and weight of the protruding plate 13 is adapted such that it biases the blocking member 11 to the closed position.

In FIGS. 3a and 3b, the protruding plate 13 is depicted as formed non-parallel (at an angle) to the damper 14, i.e. not arranged in the same plane. The angle may be chosen so as to adapt the degree of pivoting of the protruding plate 13, and thus the size of the opening into the charge air cooler 5 when the damper 14 is in the open position. Alternatively, it is foreseen within the scope of the invention that the protruding plate 13 and the damper 14 are arranged parallel to each other and/or in one and the same plane. As illustrated in FIG. 1, the protruding plate 13 extends substantially the whole width of the blocking member 11. However, it is also foreseen that the protruding plate 13 has a width smaller or larger than the blocking member 11, depending on constructional and/or aerodynamic design characteristics of the vehicle 1. It is also possible that more than one protruding plate 13 is provided, e.g. at spaced intervals along the width of the blocking member 11.

Figure 4A:
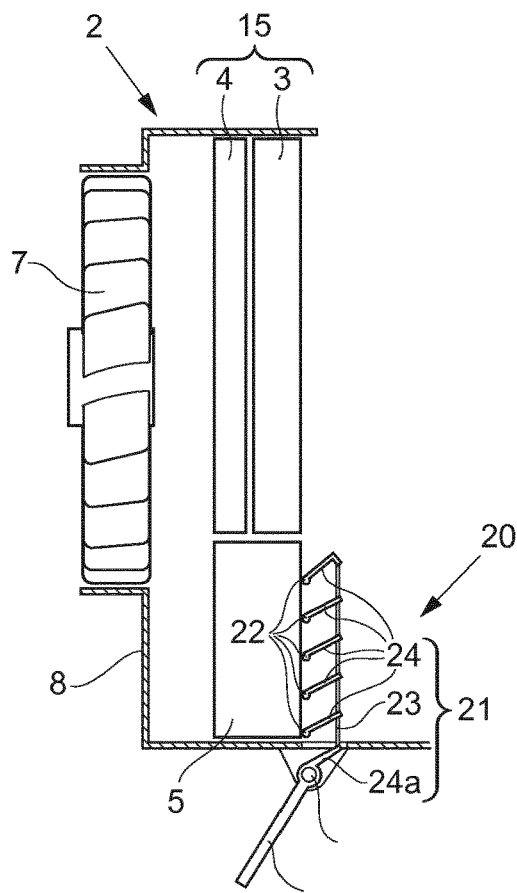
FIG. 4a shows a cross-sectional view of a cooling pack with the passive shutter mechanism according to a second embodiment of the present invention in an open position.
Figure 4B:
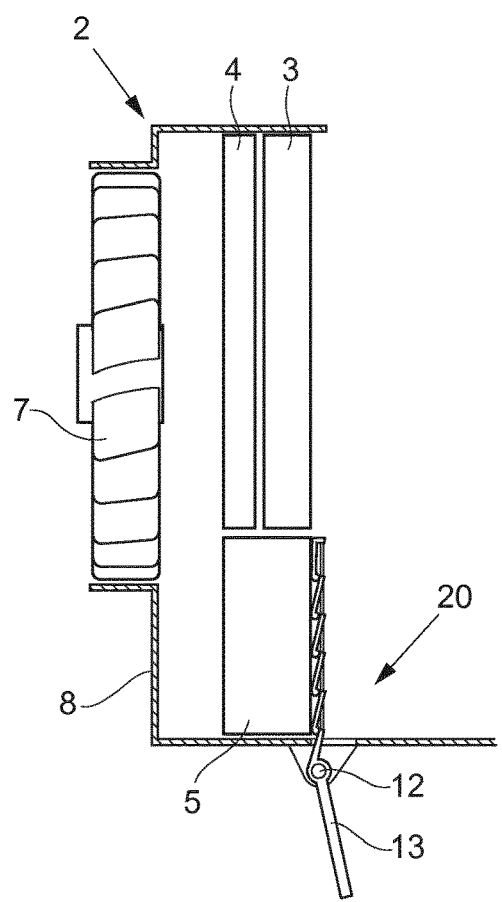
FIG. 4b shows a cross-sectional view of a cooling pack with the passive shutter mechanism according to a second embodiment of the present invention in a closed position.

In FIGS. 4a and 4b, another embodiment of a passive shutter mechanism 20 with an alternative blocking member 21 is illustrated. Here, the blocking member 21 comprises a plurality of dampers 24 or slats arranged in a frame (not shown) in front of the charge air cooler 5. The alternative blocking member 21 operates according to the same principle as explained above, wherein the dampers 24 may be brought between an open position, shown in FIG. 4a, and a closed position, shown in FIG. 4b. Each damper 24 is connected to the frame and arranged to pivot about corresponding axis of rotation 22. The axes of rotation 22 of the dampers 24 are arranged parallel to each other in a plane substantially perpendicular to the direction of airflow into the cooling pack 2 and/or the front surface of the charge air cooler 5 to effectively close the inlet to the charge air cooler 5. This arrangement has an added advantage in that it provides a more compact, space-saving blocking member 21, since the individual, smaller dampers 24 require less space for the pivoting motion. In FIGS. 4a and 4b, the axes of rotation 22 are arranged horizontally, but vertically arranged axes of rotation is also foreseen within the scope of the invention.

In order to pivot about their respective axes of rotation, the dampers 24 are interconnected by means of a pushrod 23. The blocking member 21 in this second embodiment also comprises a protruding plate 13 having the same functionality as in the first embodiment explained above. The damper 24a closest to the protruding plate 13 may be directly or indirectly attached to the protruding plate 13 such that they pivot in unison about the axis of rotation 12 when the airflow underneath the vehicle 1 acts on the protruding plate 13 depending on the (forward) movement of the vehicle 1. By means of the pushrod 23, this pivoting motion is then transferred to the other dampers 24 in the blocking member 21.

The invention claimed is:

1. A vehicle comprising:
a cooling pack comprising an airflow passage in which at least two air-cooled elements are located; and
a passive shutter mechanism comprising a blocking member displaceable between: an open position in which each of the air-cooled elements are exposed to air flow through the airflow passage, and a closed position in which the blocking member blocks the air flow to one of the air-cooled elements and leaves the remaining air-cooled elements exposed to the air flow; and
wherein displacement of the blocking member is made using motion of the vehicle so that the blocking member is in the open position during forward movement of the vehicle and is in the closed position while the vehicle is at rest and not moving; and
wherein the blocking member is moved from the open position to the closed position by air flow relative to the forward movement of the vehicle that acts on a portion of the passive shutter mechanism that is located underneath the vehicle and outside the airflow passage of the cooling pack.

2. The vehicle according to claim 1, wherein the blocking member comprises a damper pivotable between the open and closed positions about an axis of rotation perpendicular to a direction of the air flow.

3. The vehicle according to claim 2, wherein the axis of rotation is horizontal.

4. The vehicle according to claim 2, wherein the axis of rotation is vertical.

5. The vehicle according to claim 1, wherein the portion of the passive shutter mechanism that is located underneath the vehicle comprises a plate protruding below the vehicle, the plate and the blocking member fixedly joined at an axis of rotation of the blocking member.

6. The vehicle according to claim 1, wherein the blocking member comprises a plurality of dampers that are each pivotable about a respective axis of rotation between the open position and the closed position.

7. The vehicle according to claim 6, wherein the passive shutter mechanism further comprises a pushrod that interconnects the plurality of dampers, movement of the push rod placing the plurality of dampers in the open position or the closed position.

8. The vehicle according to claim 1, further comprising a battery pack arranged in fluid connection with a first of the air-cooled elements of the cooling pack and not in fluid connection with a second of the air-cooled elements of the battery pack, the second air-cooled element of the battery pack being the air-cooled element to which air flow is blocked by the closed position of the blocking member.

9. The vehicle according to claim 1, wherein the air-cooled element to which the air flow is blocked by the closed position of the blocking member is a charge air cooler.

10. A method of operating a passive shutter mechanism in a vehicle that includes a cooling pack and the passive shutter mechanism, the cooling pack having an airflow passage in which at least two air-cooled elements are located and the shutter mechanism having a blocking member displaceable between: an open position in which each of the air-cooled elements are exposed to air flow through the airflow passage, and a closed position in which the blocking member blocks the air flow to one of the air-cooled elements and leaves the remaining air-cooled elements exposed to the air flow, the method comprising the following steps:
moving the vehicle forward such that air flow outside the airflow passage and located underneath the vehicle acts on a portion of the passive shutter mechanism that is located underneath the vehicle and outside the airflow passage of the cooling pack to displace the blocking member from the closed position to the open position; and
bringing the vehicle to rest such that air flow stops acting on the passive shutter mechanism to displace the blocking member from the open position to the closed position.

11. The vehicle according to claim 1, further comprising a fan in the airflow passage, the fan creating an air draw that sucks the blocking member toward the closed position.

12. The vehicle according to claim 1, wherein the portion of the passive shutter mechanism that is located underneath the vehicle comprises a plate having a shape and weight that biases the blocking member to the closed position.

13. The method according to claim 10, wherein the portion of the passive shutter mechanism that is located underneath the vehicle comprises a plate protruding below the vehicle, the plate and the blocking member fixedly joined at an axis of rotation of the blocking member.

14. The method according to claim 10, wherein the vehicle further includes a fan in the airflow passage, the fan creating an air draw that sucks the blocking member toward the closed position.

15. The method according to claim 10, wherein the portion of the passive shutter mechanism that is located underneath the vehicle comprises a plate having a shape and weight that biases the blocking member to the closed position.

\* \* \* \* \*